July 18, 1967        L. R. HETZLER        3,332,003
VOLTAGE REGULATOR FOR GENERATORS
Filed Nov. 13, 1956
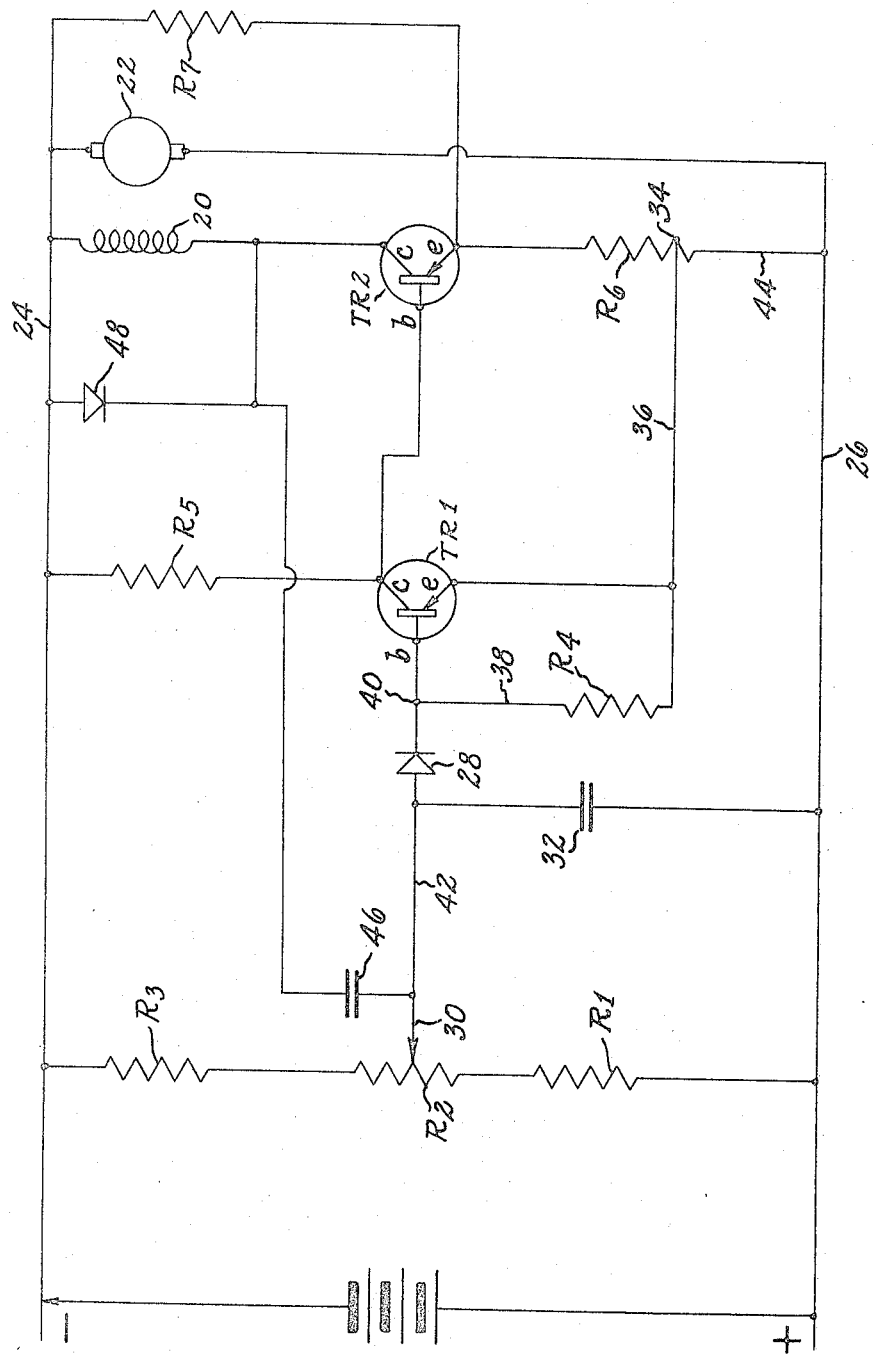
INVENTOR.
LEWIS R. HETZLER
BY
ATTORNEY

United States Patent Office 3,332,003
Patented July 18, 1967

3,332,003
VOLTAGE REGULATOR FOR GENERATORS
Lewis R. Hetzler, Anderson, Ind., assignor to General Motors Corporation, Detroit, Mich., a corporation of Delaware
Filed Nov. 13, 1956, Ser. No. 621,833
5 Claims. (Cl. 322—28)

This invention relates to voltage regulators and is more particularly concerned with a regulator wherein semi-conductors are used to control the energization of a direct current winding in response to voltage variations in a direct current line.

One of the requirements of a successful voltage regulator is that the regulator must faithfully and quickly control the current through a winding with only a small deviation in the output voltage which it is controlling. An example of a type of regulator which will achieve this control and which includes the combination of transistors which are used as amplifying means and a voltage sensitive silicon diode which is used as a control means is set forth in application, Ser. No. 546,503, filed Nov. 14, 1955, which has been assigned to the assignee of the present invention. While the voltage regulator set forth in this application has proved to be highly satisfactory, it has been found that the high degree of heating generated within the transistor has limited the use of the regulator. The present invention is concerned with an improvement in the type of regulator shown in the application which will be hereinafter described.

It is an object of the present invention to control the current flow in a direct current winding with a semi-conductor that is made alternately either fully conductive or nonconductive in response to fluctuations in line voltage so as to minimize the heating of the semi-conductor by the current which it controls.

A further object of the present invention is to make a semi-conductor either fully conductive or nonconductive as it controls the current flow through the field windings of a dynamo electric unit so as to reduce to a minimum the heating effects of the current which is controlled by the semi-conductor.

Another object of the present invention is to provide a voltage regulator for a dynamo electric unit, which regulator includes a Zener type diode, a transistor which controls the flow of current through the exciting field of the dynamo and a means for causing the transistor to be periodically either fully conductive or nonconductive while controlling the flow of current through the field.

Further objects and advantages of the present invention will be apparent from the following description, reference being had to the accompanying drawing wherein a preferred embodiment of the present invention is clearly shown.

In the drawing:

The single figure shows a circuit diagram of a voltage regulating system embodying the present invention.

Before describing the voltage regulating system shown in the drawing, it is desirable to consider some of the features of a transistor. Basically, a transistor is a current operated device. The amount of current which is permitted to pass from the emitter to the base of a transistor will control the current flowing from the emitter to the collector within the limits of the supply voltage and the load impedance. When an emitter and collector of a transistor are connected in series with a load, the transistor will control the amount of current which is permitted to flow to the load and the transistor will act as a variable resistance, whose resistance value is controlled by the base current. By way of example, if we assume that the supply voltage of a system is 12 volts and a load has a resistance of 3 ohms, the maximum current which can flow through the system is 4 amperes, assuming that it is possible to reduce the resistance of a transistor that is connected in series with the load to zero. This, of course, will result in 48 watts of power being delivered to the load and no power being dissipated in the transistor. If it is required that only two amperes of current be delivered to the load, it will then be necessary to increase the resistance of the transistor to 3 ohms. This change is accomplished by changing the base current of the transistor and will result in 12 watts being dissipated in the load and 12 watts being dissipated in the transistor. This half current condition will result in an appreciable amount of heat being generated in the transistor and to protect the transistor, it is necessary that this heat be dissipated. To accomplish this heat dissipation, a heat sink of rather large size is usually provided in the regulator. It has been found from experience that with existing generators, such as are used in present day automotive applications, in order to satisfy the field power requirements, as much as 15 to 25 watts of power must be dissipated in the transistor. In order to operate in 150° F. ambient temperature, as required in automotive electric system applications, a heat sink consisting of a copper plate of ⅛ inch thickness having a dimension in the order of 8 x 10 inches was found necessary.

The present invention is directed to a voltage regulator circuit wherein the problem of transistor heating has been largely eliminated. I have found that if a transistor is operated only in the two extreme conditions of full conductance or no conductance, the power dissipation in the transistor is very low. I have further found that the power dissipation will be in the order of 3 to 5 watts for a maximum current of 5 amperes and that this small amount of power will create no problems in heat dissipation even if the ambient temperatures are in the range of 150° to 170° F. In the voltage regulator shown in the drawing, the regulator is designed so that it will be stable under two conditions only, that is, when the field current is either at a maximum value or nearly of a zero value. The actual effective field current is controlled by means of varying the time duration of the full field current pulses in comparison to the time duration of the no field current. The rate of field current pulses is maintained sufficiently high to avoid undesirable effects which would otherwise occur from slight voltage fluctuations.

In the drawing, the output transistor TR–2 is connected in series with the field 20 of generator 22, which has its output terminals connected to the direct current leads 24 and 26. These leads 24 and 26 have the polarity as indicated, and have the voltage potential to be regulated impressed therebetween. The base $b$ of the transistor TR–2 is connected to the lead 24 through a resistance R–5. The ohmic value of this resistance is so chosen that an adequate amount of base current will flow through the transistor TR–2 to insure that it is conducting at its maximum value. The driver transistor TR–1 is essentially connected in shunt across the emitter $e$ and the base $b$ of the transistor TR–2. This driver transistor TR–1 will direvert some or all of the base current from the transistor TR–2, thus, raising or lowering the current through field 20 inversely with the conductance of transistor TR–1. It has been found that the resistance of a transistor is never reduced completely to zero and, therefore, the resistance of TR–1 will always cause a slight conductance of transistor TR–2 so that the field current with the circuit heretofore described will never be reduced to zero. To overcome this problem, the bias resistors R–6 and R–7 are used. R–6 has a very low ohmic resistance value so that the voltage drop thereacross with full field current will not be appreciable. At low values of field current, the ohmic value of R–7 is selected to pass enough current into R–6 to produce a voltage drop across R–6 which will equal or slightly exceed the minimum voltage drop across the emitter $e$ to collector $c$ of the driver transistor TR–1. Thus, when the transistor TR–1 is conducting at its maximum, the potential of the base and emitter of transistor TR–2 will be the same and the emitter to collector current of TR–2 will be zero and the current through field 20 will be zero. From the above, it is apparent that an increase in the base current of the transistor TR–1 will result in a decrease in current in field 20. Further, the current through field 20 will be stable at any specific level of current through the base in the transistor TR–1.

The device which renders the system voltage responsive is the silicon junction diode 28. This diode is connected in series with the base circuit of the transistor TR–1 and s connected to block the flow of DC current through the base. The diode circuit is completed by connecting the diode 28 to the movable arm 30 on the potentiometer resistance R–2, which is part of a voltage divider network R–1, R–2 and R–3 that is connected between leads 24 and 26. The diode 28 is characterized by the fact that up to a particular voltage, called the Zener voltage, the diode is a very high resistance element. Beyond this particular voltage, the resistance of the diode drops abruptly and for a small change in voltage, a large change in current passing therethrough will take place. The voltage divider is so designed and adjusted that when the desired predetermined voltage level between leads 24 and 26 is reached, the voltage at the silicon diode will be equal to or slightly greater than the Zener voltage of the diode. From the above, it will be seen that if the regulated voltage between leads 24 and 26 is less than a predetermined value, then the diode will act as a high resistance element and no current will flow between the emitter $e$ and the base $b$ of the transistor TR–1. This will cause the current through the circuit, which includes the resistance R–5, the base $b$ and emitter $e$ of transistor TR–2, and resistance R–6 to be at a maximum and as a result a maximum field current will flow through the circuit which includes resistance R–6, emitter $e$ and collector $c$ of transistor TR–2 and the field 20. As the voltage between leads 24 and 26 rises, the diode 28 will suddenly become conductive and the base current in transistor TR–1 will suddenly begin and increase because of the characteristic action of the diode 28. When this occurs, the transistor TR–1 will shunt some of the current through resistance R–5 from the base of transistor TR–2. When the current through the base of transistor TR–2 is thus reduced, the current through field 20 will be correspondingly reduced to a value dictated by the setting of the tap 30 on the voltage divider network. In general, it may be said that any particular value of regulated voltage between leads 24 and 26 will result in a specific amount of current flowing through field 20. The total change in regulated voltage required to change the field current over its entire range has been found to be in the order of 0.1 to 0.3 volt.

The condenser 32 is used as a filter and will smooth out the ripple which appears in the DC leads 24 and 26 which would otherwise affect the regulation of the system. It is well recognized that an inductance may be used in series with the diode 28 or a combination inductance and capacitance may be used for the same purpose.

Included in the circuit in the drawing is a feedback circuit which acts as a means to render the regulator unstable at any point between full and zero current which flows through the field 20. This means includes the tap 34 on R–6, the lead 36, resistance R–4 and the lead 38, which is connected to a junction 40 between the diode 28 and the base B of transistor TR–1. To understand the effect of this means, the voltage sensing circuit will now be considered. The sensed voltage which controls the conduction of diode 28 consists essentially of the voltage between lead 26 and the tap 30 of the potentiometer. This voltage is impressed across the sensing loop which includes: tap 30, lead 42, diode 28, the base $b$ to emitter $e$ on transistor TR–1, the lead 38, resistance R–4, lead 36, the tap 34 on resistance R–6 and lead 44. The tap 34 on R–6 is selected so that when the current through field 20 changes from essentially zero to its maximum value, the voltage between tap R–6 and lead 26 will change approximately 0.1 volt. It is apparent that in terms of the sensing loop, the voltage drop across the sensing loop which is the feedback voltage will subtract from the sensed voltage. Thus, assuming that the regulating voltage is high, that is, the voltage between leads 24 and 26, the field current is nearly zero, the feedback voltage will be at a minimum. As the regulated voltage is decreased, the field current, likewise, will begin to increase, which, in turn, will cause the feedback voltage to increase. However, the feedback voltage subtracts from the sense voltage and thereby aggravates sensed voltage drop to further increase the field current until the conductance of transistor TR–2 between emitter $e$ and collector $c$ is at a maximum and the current through field 20 will be at a maximum value determined by the resistance values of the field. The maximum field current will cause the regulated voltage between leads 24 and 26 to increase and at a point, the process will be reversed and the field current will begin to lower. This will cause the feedback voltage to be reduced, which, in turn, will cause the sensed voltage to rise abnormally so as to drive the field current to zero. This oscillation will be repetitive at a rate governed by the system characteristics, that is, a response time of the regulator, generator, and the balance of the electrical system. If the feedback is properly selected, the regulator will be unstable at any but extreme conditions of minimum or maximum field current. The capacitor 46, which is connected as shown, is used to increase the feedback signal when a change in current begins. The charge and discharge of this capacitor will provide a positive or negative pulse to the sensing circuit which will speed the change from zero to full field current or vice versa. The rectifier 48 is used to assist in suppressing the voltage transient when the field current is suddenly reduced to zero. This rectifier 48 also will provide a path for the field current during the time when the transistor TR–2 has reduced the current to zero. The current which flows during this time is caused by the induced voltage in the field coil due to the field collapse. The rectifier will aid in smoothing out the field current to a considerable extent and will result in an improved regulation of the generator system.

The regulator herein shown will operate as a voltage regulator on a DC generator, or an AC generator whose output is rectified by rectifiers and then used as DC. Further, the regulator shown can be used to regulate an AC generator if a portion of the AC power is rectified to DC to provide a sensing means in order to regulate the AC voltage. If desired, the rectified DC can be used to supply a DC exciting field current if no separate direct current exciter is used. It is further apparent that the regulating system shown and described may be used as a regulator for other types of units such as saturable reactors to control the output of the reactor if the control winding of the reactor is controlled by the transistor TR–2 in a manner well known to those skilled in the art and as heretofore set forth.

While the embodiment of the present invention as herein disclosed, constitutes a preferred form, it is to be understood that other forms might be adopted.

What is claimed is as follows:

1. In combination, a power source having a control winding for controlling the voltage output of said source as a function of current flow therethrough, a D.C. load circuit including a pair of conductors connected to be energized by said power source, a transistor, means connecting said transistor and control winding in series circuit relationship across said conductors whereby the conduction of said transistor controls the current flow through the control winding and the voltage output of said source, a voltage sensing circuit connected with said transistor for controlling the conduction thereof, means for deriving a control voltage that is proportional to the voltage appearing across said leads, means for applying said control voltage to said sensing circuit, means for driving said transistor to either a fully conductive or fully non-conductive state, a circuit element connected in series with the collector-emitter circuit of said transistor for developing a triggering voltage that is proportional to current flow through the collector-emitter circuit of said transistor and control winding, and means connecting said circuit element and said sensing circuit such that said control voltage applied to said sensing circuit from said conductors is reduced by the amount of said triggering voltage developed across said circuit element.

2. In combination, a power source, a control winding for controlling the voltage output of said power source as a function of current flow therethrough, a D.C. load circuit including a pair of leads connected to be energized from said power source, a first transistor having base, emitter and collector electrodes, means connecting the emitter-collector circuit of said first transistor in series with said control winding and across said leads, a second transistor having base, collector and emitter electrodes, means connecting the collector electrode of said second transistor with one of said leads and with the base electrode of said first transistor, means for deriving a first voltage that is proportional to the voltage appearing across said leads, means for deriving a second voltage that is proportional to current flow through the emitter-collector path of said first transistor, a voltage responsive circuit connected with the emitter and base electrodes of said second transistor for controlling the conduction thereof, and means for applying the difference in said first and second voltages to said voltage responsive circuit.

3. In combination, a power source, a control winding for controlling the voltage output of said source as a function of current flow therethrough, a two lead direct current circuit connected to be energized from said power source, a first transistor having base, emitter and collector electrodes, a second transistor having base, emitter and collector electrodes, a first current path connecting said leads including the emitter-collector circuit of said first transistor and said control winding, a second current path connecting said leads including the emitter-collector circuit of said second transistor, voltage sensing means coupled to the emitter and base of said second transistor for controlling the conduction of said second transistor as a function of the voltage appearing across said leads, a circuit having resistance bypassing the emitter-collector circuit of said first transistor, means for deriving a first control voltage including a second circuit element having resistance connected in series with the emitter-collector circuit of said first transistor, a circuit for applying said first control voltage across the emitter and base electrodes of said first transistor through the emitter-collector circuit of said first second transistor, said control voltage being of such a magnitude and polarity as to render said first transistor substantially fully nonconductive when said second transistor is substantially fully conductive, means for developing a second control voltage including a third circuit element having resistance connected in series with the emitter-collector circuit of said first transistor and means for reducing the voltage applied to said voltage sensing means from said leads by the amount of said second control voltage.

4. In an electric circuit for controlling current flow through a circuit element, the combination comprising, a source of direct current voltage, a two lead direct current circuit connected with said source, a first transistor having base, emitter and collector electrodes, a second transistor having base, emitter and collector electrodes, a first current path connecting said leads including the emitter-collector circuit of said first transistor and said said circuit element, a second current path connecting said leads including the emitter-collector circuit of said second transistor, means for applying a first control voltage that is proportional to the value of the voltage of said source of direct current across the emitter and base electrodes of said second transistor for controlling its conduction, means for deriving a second control voltage including a second circuit element connected in series with the emitter-collector circuit of said first transistor, a circuit for applying said second control voltage to the emitter and base electrodes of said first transistor through the emitter-collector circuit of said second transistor, said second control voltage being of such a magnitude and polarity as to render said first transistor substantially fully nonconductive when said second transistor is substantially fully conductive, and a third circuit element connected in series with the emitter-collector circuit of said first transistor, and means connecting said third circuit element with the emitter and base electrodes of said second transistor such that said first control voltage is reduced by the amount of voltage developed across said third circuit element.

5. In an electric circuit for controlling current flow through a circuit element, the combination comprising, a source of direct current voltage, a two lead direct current circuit connected with said source, a first transistor having base, emitter and collector electrodes, a second transistor having base, collector and emitter electrodes, means connecting the emitter-collector circuit of said first transistor in series with said circuit element and across said leads, means connecting said transistor and leads whereby said first transistor is caused to become ubstantially fully nonconductive when said second transistor is substantially fully conductive, means for deriving a first voltage that is proportional to the voltage appearing across said leads, means for deriving a second voltage that is substantially proportional to current flow through the emitter-collector path of said first transistor, a voltage responsive circuit connected with the emitter and base electrodes of said second transistor for controlling its conduction, and means for applying the difference in said first and second voltages to said voltage responsive circuit.

References Cited
UNITED STATES PATENTS

| | | | |
|---|---|---|---|
| 1,936,692 | 11/1933 | Stroller | 322 |
| 2,546,549 | 3/1951 | Laird et al. | 322—72 X |
| 2,751,545 | 6/1956 | Chase. | |
| 2,767,364 | 10/1956 | Guggi | 318—317 |
| 2,767,365 | 10/1956 | Guggi | 318—327 |
| 2,809,301 | 10/1957 | Short. | |

MILTON O. HIRSHFIELD, *Primary Examiner.*

JOHN C. HENDRICKS, ORIS L. RADER, LLOYD McCOLLUM, JOHN F. COUCH, *Examiners.*

R. C. SIMS, A. T. TISCHER, J. J. SWARTZ, G. PARKER, *Assistant Examiners.*